Feb. 14, 1939. W. G. LYONS 2,147,377
COLLAPSIBLE RIM FOR VEHICLE WHEELS
Filed May 23, 1938 3 Sheets-Sheet 1

INVENTOR
WALTER G. LYONS
by J. H. Weatherford
Atty.

Feb. 14, 1939.  W. G. LYONS  2,147,377
COLLAPSIBLE RIM FOR VEHICLE WHEELS
Filed May 23, 1938  3 Sheets-Sheet 2

INVENTOR
WALTER G. LYONS

Feb. 14, 1939.                    W. G. LYONS                    2,147,377
                    COLLAPSIBLE RIM FOR VEHICLE WHEELS
                    Filed May 23, 1938           3 Sheets-Sheet 3
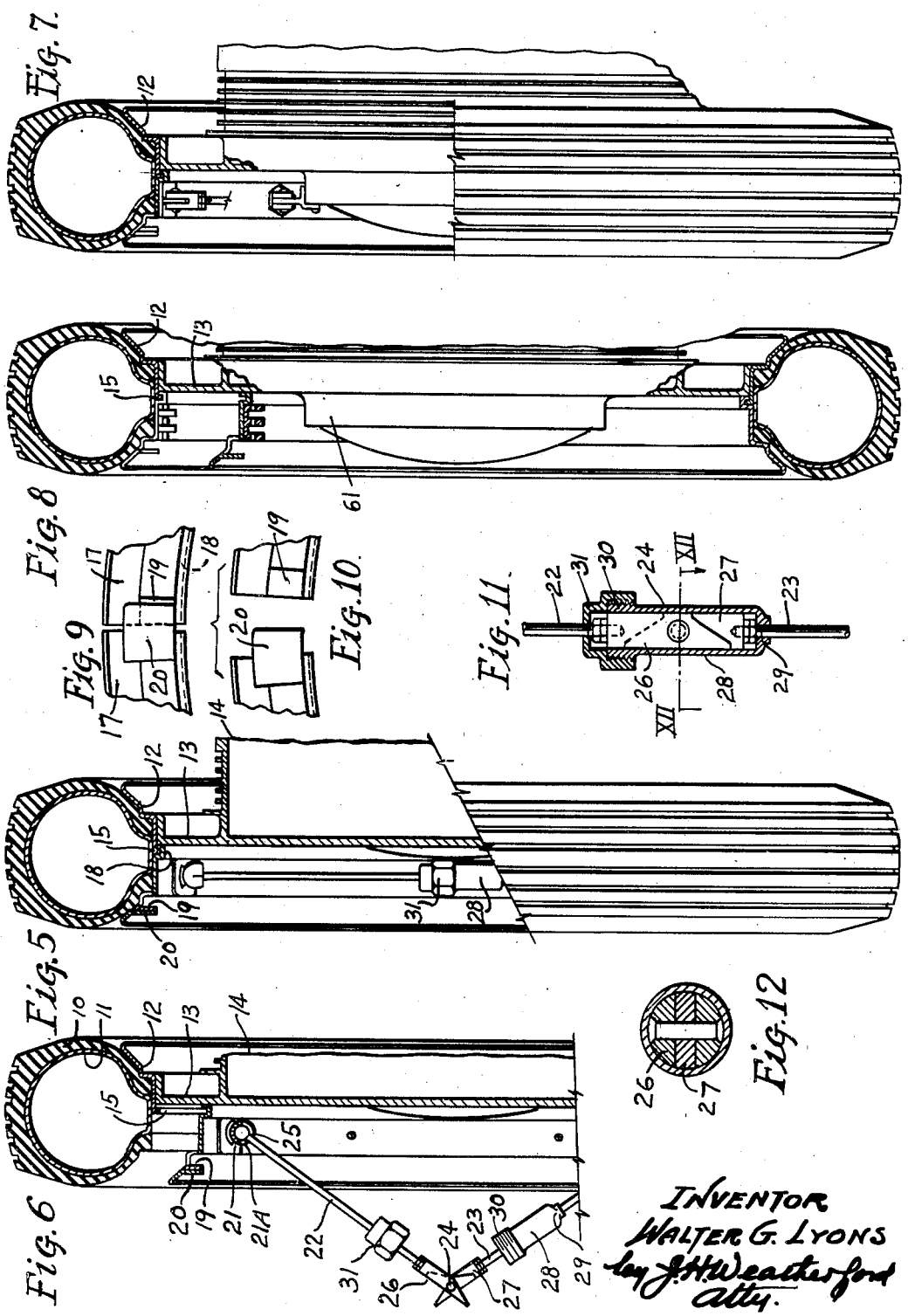

Patented Feb. 14, 1939

2,147,377

UNITED STATES PATENT OFFICE 2,147,377

COLLAPSIBLE RIM FOR VEHICLE WHEELS

Walter G. Lyons, Memphis, Tenn.

Application May 23, 1938, Serial No. 209,490

10 Claims. (Cl. 152—377)

This invention relates to collapsible rims for vehicle wheels and has especial reference to a collapsible rim for a pneumatic tire on such a wheel.

The objects of the invention are:

To make a rim which may be easily collapsed and removed in order that complete access be had to the tire casing and that such casing and the tube therein may be readily removed and replaced.

A further object is to make a rim having a collapsible portion which may be quickly and easily replaced after a tire has been put thereon and he solidly locked together and to the solid portions of the rim with a minimum of effort.

A further object is to make a rim for a vehicle wheel, which rim comprises a rigidly supported portion and a collapsible portion and collapsing means therefor, adapted on replacement of the tire casing and tube on the solid portion of the rim to close and lock the collapsible portion firmly in place.

A further object is to improve the detail and construction of a locking mechanism.

The means by which the foregoing and other objects are accomplished and the method of their accomplishment will readily be understood from the following specification on reference to the accompanying drawings, in which:

Fig. 5 is a section taken as on the line V—V of Fig. 1; and

Figure 2:
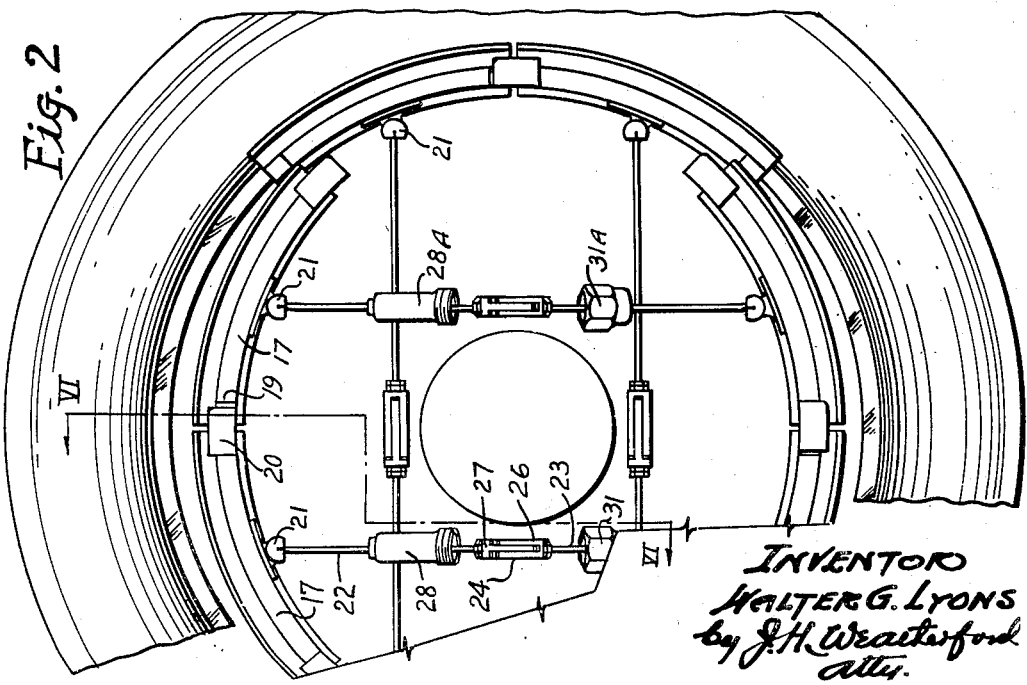
Fig. 2 is a similar side elevation showing the locking means uncoupled and portions of the rim retracted to permit removal.

Fig. 6 a view taken on the line VI—VI of Fig. 2.

Figure 3:
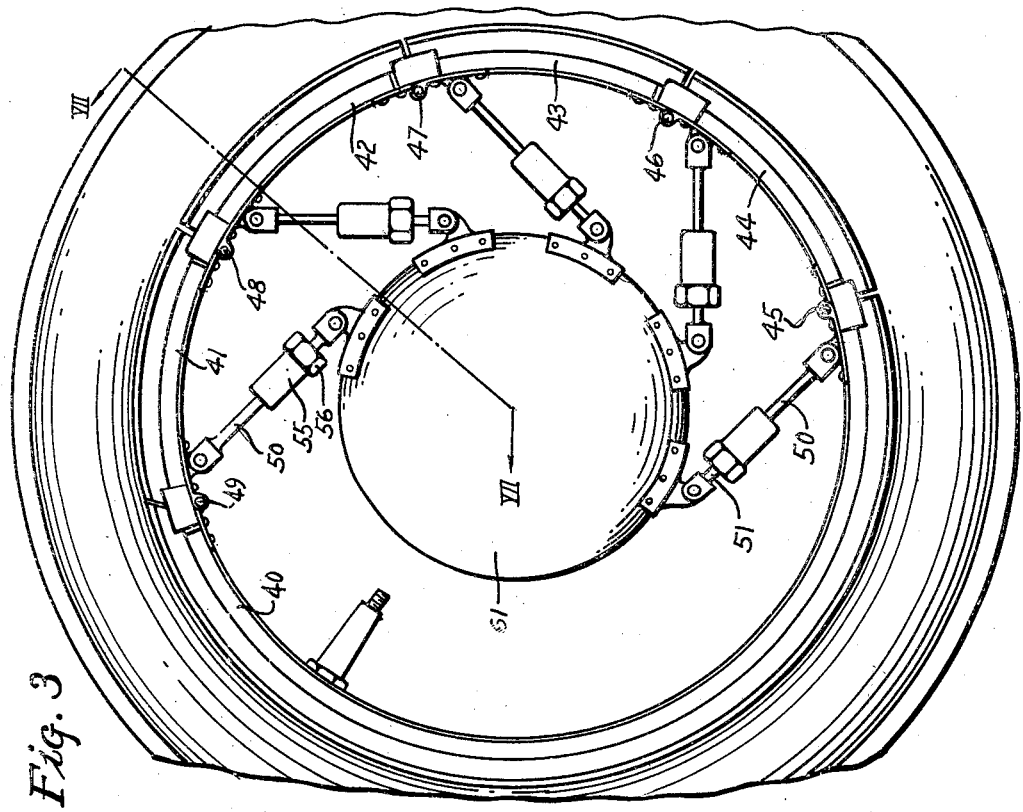
Fig. 3 is a view corresponding to Fig. 1 showing a modification of the locking arms with the rim locks and tire locked in place.

Fig. 7 is a section taken on the line VII—VII of Fig. 3; and

Figure 4:
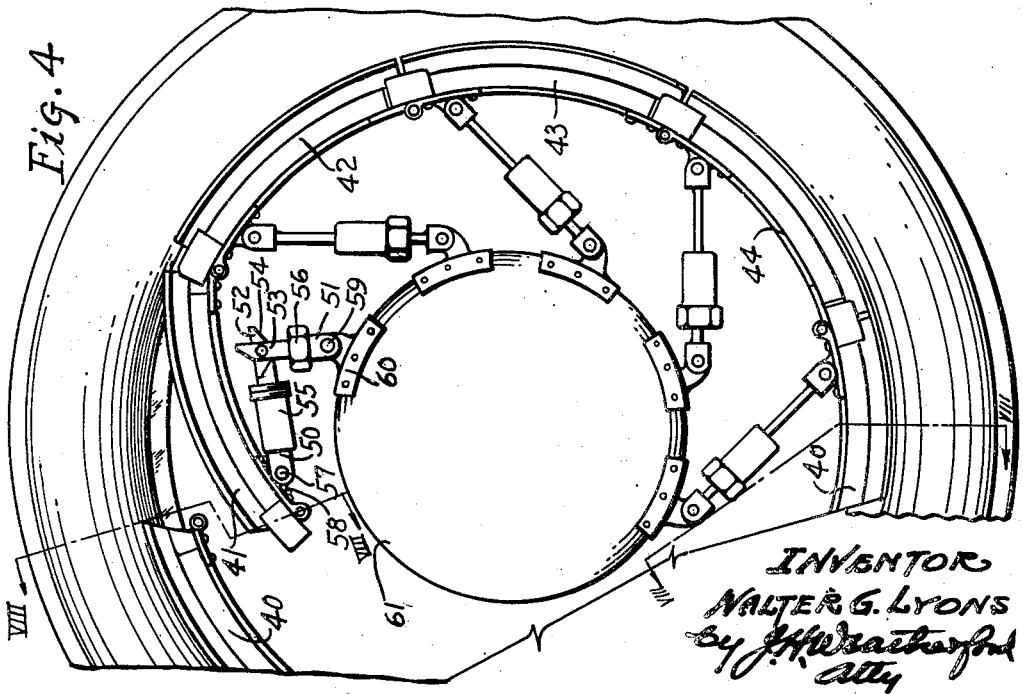
Fig. 4 shows the same mechanism as beginning of collapsing movement occurs.

Fig. 8 a similar section taken on the line VIII—VIII of Fig. 4.

Fig. 9 is an enlarged side view of abutting end portions of two of the rim sections showing alining lugs; and Fig. 10 the same rim portions and lugs as they would appear if pulled apart.

Fig. 11 is an enlarged sectional view of the locking mechanism.

Fig. 12 is a further enlarged cross section taken on the line XII—XII of Fig. 11.

Referring now to the drawings in which the various parts are indicated by numerals:

10 is a typical tire casing and 11 the inner tube. 12 is an annular rim supporting substantially one-half, and lying against one side, of the casing 10, this annular rim being supported by a flanged disc 13. 14 is the usual brake drum. The rim 12 is provided with an annular integral flange 15 extending therearound, all of these parts being common to both modifications of the device.

The collapsible rim comprises eight substantially identical sections 17, these sections being substantially identical in cross section with the half rim section 12, except that each is provided with an arcuate groove 18 complementary to the annular flange 15 and adapted to interlock therewith. Each of the rim sections 17 is provided at one end with a flat lug 19 and at the opposite end with a complementary lug 20, the lug 20 of one section overlying and contacting the lug 19 of the other section. Each section is provided with a ball socket 21. 22, 23 are a pair of toggle arms, hingedly connected together at one end as by a pin 24 (Fig. 6) and each having at its opposite end a ball 25 which is seated in a socket 21, the thrust portion of the sockets being hemispherical and the outer portions thereof preferably having split portions 21A which are clamped around the ball 25 to retain it in the socket.

Figure 1:
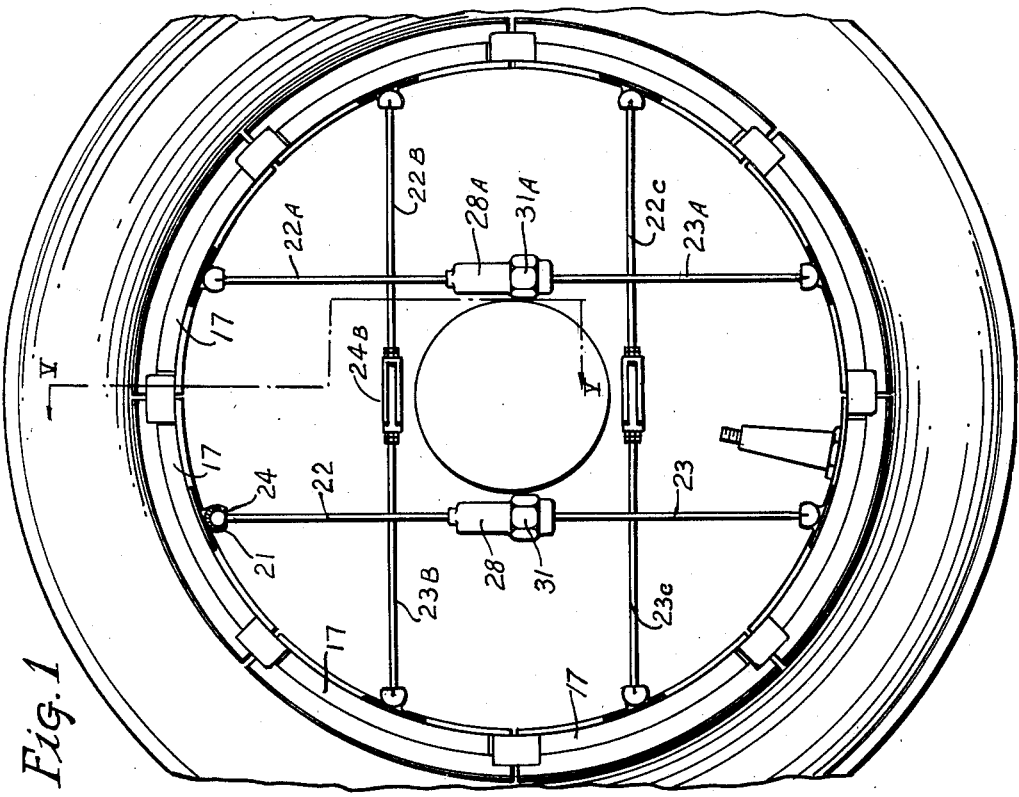
Fig. 1 is a side elevation of a wheel and tire showing the collapsible portion of the rim locked in place and the locking mechanism coupled.

The rod 22 has secured on its pin end a yoke member 26 which is exteriorly circular in cross section as shown on an enlarged scale in Fig. 12, and is channelled out to receive the tongue end of a complementary member 27, secured on the pin end of the rod 23, this member being also of circular exterior section, the two members being hingedly connected by the pin 24, and when alined forming a substantially cylindrical body. 28 is a locking sleeve bored out to snugly fit over and around the members 26 and 27 when these members and the rods 22 and 23 are axially alined. The sleeve 28 is provided at one end with a head portion 29 adapted to snugly but slidably fit the rod 23 and at the opposite end is provided with an exteriorly threaded portion 30. 31 is an annular nut slidably mounted on the rod 22 and interiorly threaded to engage the threaded portion 30, the nut 31 being adapted to draw the sleeve 28 solidly into place over the members 26 and 27 and hold them and the rods 22 and 23 in alinement, and also being adapted to be unscrewed from the sleeve 28 to allow this sleeve to be slid back from engagement with the members 26 and 27 to release them for pivotal movement about the pin 24. Obviously the interior of the sleeve may slightly enlarge from the head end toward the threaded end, and the exterior of the members 26, 27 have a complementary taper to insure tight engagement. The rods 22 and 23 connect a pair of the sections 17 lying, as shown in Figs. 1 and 2, immediately to the left of the vertical wheel diameter and a similar pair of arms 22A, 23A, similarly coupled and held in alinement by a sleeve 28A and nut 31A connect pairs of sections 17 lying immediately to the right of the same wheel diameter.

An additional pair of sections 17 in these views immediately above the horizontal wheel diameter are similarly connected by toggle arms 22B, 23B, similarly pin connected, and the remaining pair of sections below the horizontal diameter are connected by toggle arms 22C and 23C, these latter pairs of toggle arms preferably underlying the first mentioned pairs of arms and being held when in extended or locked position by the overlying arms 22, 23; 22A, 23A, there preferably being no sleeve corresponding to the sleeves 28, 28A provided for these underlying arms, though obviously should it be so desired such sleeves may be provided.

In the form of the device shown in Figs. 3, 4, 7 and 8 the collapsible rim is made up of sections 40, 41, 42, 43 and 44. The section 40 being substantially semi-circular and the sections 41, 42 and 43 and 44 being short sections. The section 44 is hingedly connected as by a pin 45 to one end of the section 40, and the sections 43, 42 and 41 are similarly connected by pins 46, 47 and 48 to their respective preceding sections 44, 43 and 42. 49 is a removable pin for coupling the section 41 to the section 40 and completing the rim circle.

50, 51 are a pair of toggle arms having end portions 52, 53 respectively, similar to the members 26, 27 of the arms 22 and 23 and similarly hingedly connected by a pin 64. 55 is a sleeve corresponding to the sleeve 28, and 56 a nut corresponding to the nut 31. The rod 50 is connected with the free end of the rim section 41 by a pin 57, the connection being made through a bracket 58. The rod 51 is connected by a pin 59 and bracket 60 to a hub portion 61, forming an integral part of the wheel disc 13. Similar toggles are provided for each of the remaining rim sections 42, 43, 44 and 40.

In Fig. 4 the rim section 41 is shown disconnected and drawn away from the rim section 40, the toggle arms 50, 51 being collapsed to accomplish such movement.

In Fig. 3 this same pair of arms are shown with the toggle straightened out and the arms held in such straightened out position by the sleeve 55 and nut 56, the rim section 41 being in tire holding position and the pin 49 coupling this section to the section 40 being shown in place.

In using that form of the device shown in Figs. 1 and 2, the nuts 31 and 31A are loosened and the sleeves 28, 28A withdrawn from the members 26, 27. These members are then drawn outward to the position shown in Fig. 6, withdrawing four of the sections 17, thereby disengaging the grooves 18 from the annular flange 15 and permitting removal of the four sections from the wheel. Subsequently the rods 22B, 23B and 22C, 23C, released by the removal of the arms 22, 23; and 22A, 23A, are loosened and the four remaining rim sections similarly removed. The tire casing 10 thus released and the tube 11 therein may be then removed from the wheel.

It will be understood that unless the tube 11 is deflated, deflation must be accomplished as by opening the usual tire valve subsequent to the removal of the rim sections. After the tire casing has been removed a new or repaired tube is placed in the casing and the casing and tube assembly put in place on the solid half 12 of the rim. The last removed sections are replaced and the toggle arms 22B, 23B, and 22C, 23C straightened out, the remaining four sections are similarly placed and their toggle arms straightened out, and against the first toggle arms and the retaining sleeves 28, 28A, pulled over the toggle joints and secured by their respective nuts 31, 31A. Thereafter the tube is inflated in any usual or desired manner and the wheel is ready for use.

It will be seen that a space is left between each of the sections 17 and the adjoining sections, which spaces permit the withdrawal of the first four sections mentioned. Should it be desired, however, the ends of the sections 17 may be shaped as are the complementary ends of the sections 40 and 41 to additionally relieve the sections from jamming in their removal.

In that form of the device shown in Figs. 3 and 4 the pin 49 is removed, the toggle arms 50, 51 collapsed withdrawing the rim section 41 and each of the remaining sections 42, 43, 44 and the section 40 are similarly collapsed, drawing them radially inward away from the remaining solid half 12 of the rim and similarly permitting removal and replacement of the casing and tube. After removal of the tube from the casing, and its replacement, the tube and casing are replaced as before on the solid half of the rim and the toggle arms successively tightened to force the withdrawn sections back into place with their grooves 18 in engagement with the annular flange 15. The tube is inflated and the tire is ready for use.

I claim:

1. A collapsible rim for a vehicle wheel, comprising halves separable in a plane at right angles to the axis of the wheel; one of said halves being rigidly supported from the wheel hub, said half having an annular flange extending inward adjacent the plane of separation, the other half comprising a plurality of sections, the inner edge of each underlying, and being provided with a groove complementary to, said annular flange, and toggle links, hingedly connected to said sections, said links being straightenable to engage said section grooves with said flange and lock said halves together.

2. A collapsible rim for a vehicle wheel, comprising complementary annular parts; one of said parts being continuous and rigidly supported from the wheel hub, said part having an annular flange extending inward adjacent its inner edge, the other part comprising a plurality of sections, the inner portion of each section underlying, and being provided with an arcuate groove complementary to, said annular flange, and toggle links hingedly connected to said sections, said links being straightenable to engage said section grooves with said flange and lock said parts together.

3. A collapsible rim for a vehicle wheel, comprising complementary annular parts; one of said parts being continuous and rigidly supported from the wheel hub, said part having an annular flange extending inward adjacent its inner edge, the other part comprising a plurality of sections, the inner portion of each section underlying, and being provided with an arcuate groove complementary to, said annular flange, toggle links hingedly connected to said sections, said links being straightenable to engage said section grooves with said flanges, and means each for securing a said link in straightened position.

4. A collapsible rim for a vehicle wheel, comprising complementary annular parts; one of said parts being continuous and rigidly supported from the wheel hub, said part having an annular flange extending inward adjacent its inner edge, the other part comprising a plurality of sections, the inner portion of each section underlying, and being provided with an arcuate groove complementary to, said annular flange, toggle links hingedly connected to said sections, said links being straightenable to engage said section grooves with said flanges, and means each surrounding and shiftable along a said link into position over the hinge of said link for securing said link in straightened position.

5. A collapsible rim for a vehicle wheel, comprising complementary annular parts; one of said parts being continuous and rigidly supported from the wheel hub, said part having an annular flange extending inward adjacent its inner edge, the other part comprising a plurality of sections, the inner portion of each section underlying and being provided with an arcuate groove complementary to said annular flange, toggle links hingedly connected to said sections said links being straightenable to engage said section grooves, with said flanges, and sleeves each disposed around a said link and shiftable therealong into position over the toggle hinge of said link for holding said link in straightened position.

6. A collapsible rim for a vehicle wheel, comprising a pair of annular parts separable in a plane at right angles to the axis of the wheel, one of said parts being rigidly supported from the wheel hub, said part having an annular flange extending inward adjacent the plane of separation, the other part comprising a plurality of sections, the inner edge of each section underlying, and being provided with a groove complementary to, said annular flange; rods in pairs hinged together to form toggle links, and hingedly connected at their opposite ends to said sections, said links being straightenable to engage said section grooves with said flange to lock said parts together, the hinge joint portion of each said link when straightened being cylindrical, and a sleeve complementary to said cylindrical portion movable longitudinally into engagement therearound.

7. A collapsible rim for a vehicle wheel, comprising a pair of annular parts separable in a plane at right angles to the axis of the wheel, one of said parts being rigidly supported from the wheel hub, said part having an annular flange extending inward adjacent the plane of separation, the other part comprising a plurality of sections, the inner edge of each section underlying, and being provided with a groove complementary to, said annular flange; rods in pairs hinged together to form toggle links, and hingedly connected at their opposite ends to said sections, said links being straightenable to engage said section grooves with said flange to lock said parts together, the hinge joint portion of each said link when straightened being cylindrical; a sleeve complementary to said cylindrical portion movable longitudinally into engagement therearound, and means for retaining said sleeve in engagement.

8. A collapsible rim for a vehicle wheel, comprising complementary annular parts separable in a plane at right angles to the axis of the wheel, one of said parts being rigidly supported from the wheel hub, said part having an annular flange extending inward adjacent the plane of separation, the other part comprising eight sections, the inner edge of each section underlying, and being provided with a groove complementary to, said annular flange, toggle links, each hingedly connected to an oppositely disposed pair of said sections, said links being straightenable to engage said section grooves with said flange to lock said parts together, and means to retain said links in straightened position.

9. A collapsible rim for a vehicle wheel, comprising complementary annular parts separable in a plane at right angles to the axis of the wheel, one of said parts being rigidly supported from the wheel hub, said part having an annular flange extending inward adjacent the plane of separation, the other part comprising a plurality of pairs of sections, the inner edge of each section underlying, and being provided with a groove complementary to, said annular flange, toggle links, each hingedly connected to an oppositely disposed pair of sections, said links being straightenable to engage said section grooves with said flange to lock said parts together, and means to retain said links in straightened position.

10. A collapsible rim for a vehicle wheel, comprising complementary annular parts separable in a plane at right angles to the axis of the wheel, one of said parts being rigidly supported from the wheel hub, said part having an annular flange extending inward adjacent the plane of separation, the other part comprising a plurality of pairs of sections, the inner edge of each section underlying, and being provided with a groove complementary to, said annular flange, toggle links, each hingedly connected to an oppositely disposed pair of said sections, said links being straightenable to engage said section grooves with said flange to lock said parts together, and sleeves, each slidable along a said link into engagement around the toggle joint of said link, to retain said links in straightened position.

WALTER G. LYONS.